July 6, 1948.  W. G. LUNDQUIST  2,444,659
THRUST BALANCING MEANS
Filed Nov. 24, 1944
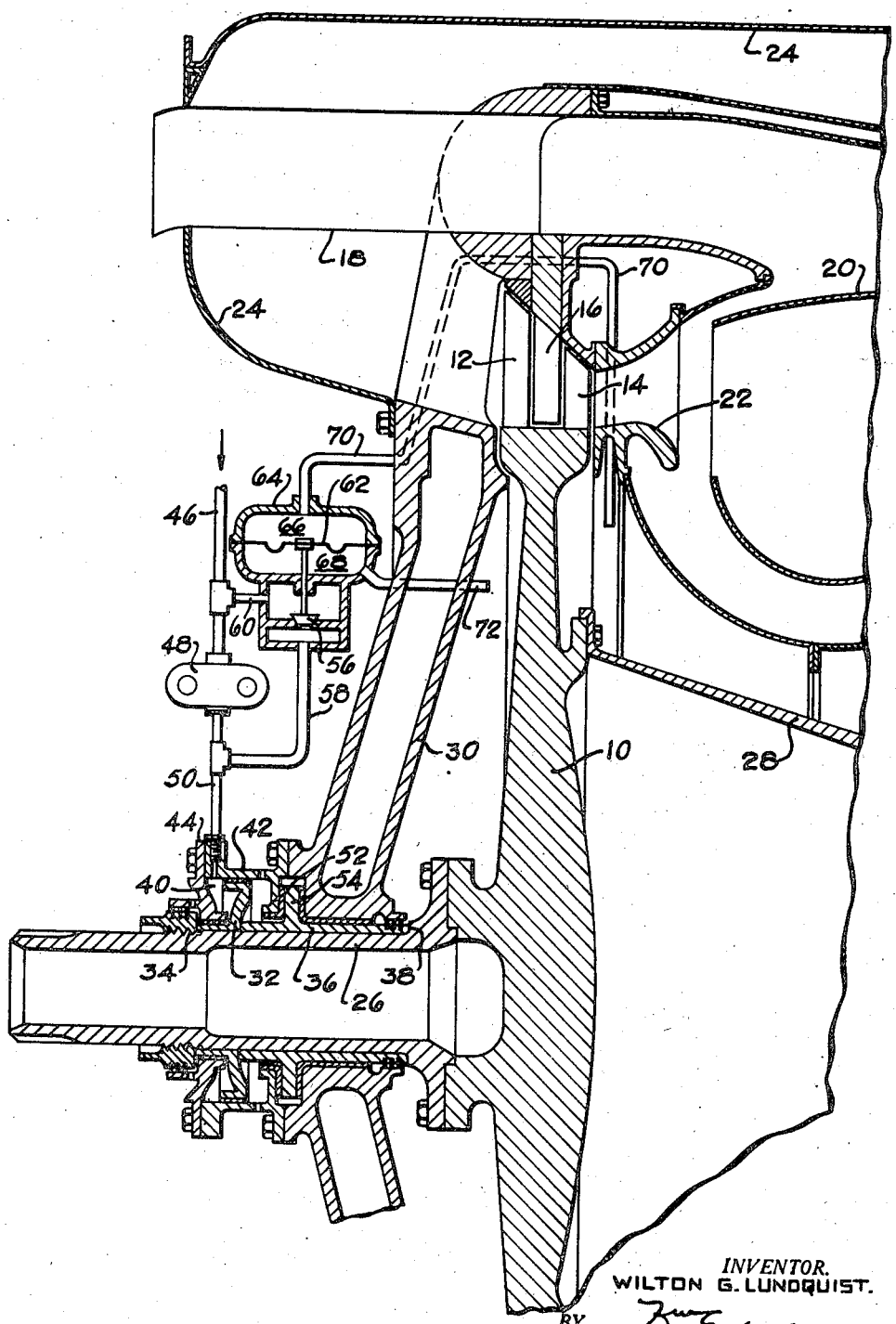
INVENTOR.
WILTON G. LUNDQUIST.
BY
ATTORNEY Patented July 6, 1948

2,444,659

UNITED STATES PATENT OFFICE 2,444,659

THRUST BALANCING MEANS

Wilton G. Lundquist, Ho-Ho-Kus, N. J., assignor to Wright Aeronautical Corporation, a corporation of New York Application November 24, 1944, Serial No. 565,020

5 Claims. (Cl. 253—39)

This invention relates to thrust balancing means and is particularly directed to the provision of hydraulic means for balancing an axial thrust on a rotating member as for example a turbine.

One of the problems encountered in the operation of a turbine, particularly with a reaction turbine, is the provision of adequate means for carrying the axial thrust on the turbine rotor produced by the pressure differential of the turbine motive fluid across the turbine rotor. It is an object of this invention to provide hydraulic means to at least partially balance this axial thrust without the use of complicated thrust bearings and at the same time to maintain a fixed axial location of the turbine rotor. It is a further object of this invention to control the magnitude of the hydraulic balancing pressure in accordance with changes in the pressure differential of the turbine motive fluid across the turbine rotor.

Specifically the invention comprises a piston-like member carried by a shaft extending from the turbine rotor and rotatable therewith. This piston-like member is rotatable within a fixed cylinder and a fluid pressure, acting against the piston-like member, serves to balance the axial thrust on the turbine rotor. In addition, the magnitude of this balancing fluid pressure is controlled by the pressure differential across the turbine rotor. The invention also comprises a radially extending flange carried by the turbine shaft and fitted to a fixed bearing. With this construction, the turbine is accurately located in an axial direction by this radial flange and any residual thrust in either direction on the turbine rotor is taken by this flange.

Other objects of this invention will become apparent upon reading the annexed detailed description in connection with drawing which comprises an axial section through a portion of a gas turbine power plant and illustrates the hydraulic thrust balancing means of this invention in combination therewith.

Referring to the drawing, a gas turbine power plant is provided with a turbine rotor or wheel 10 having one or more axially spaced sets of blades disposed about the periphery of the turbine wheel. As illustrated, the wheel 10 is provided with two sets of blades 12 and 14 and a fixed set of blades 16 is carried by the power plant between the rotating blades 12 and 14. Compressed air for combustion is supplied through a plurality of ducts 18 disposed about the turbine wheel 10 and communicating with a combustion chamber partly illustrated at 20. From the combustion chamber, the combustion gases flow through an annular turbine nozzle construction 22 and thence through the turbine blades and into an annular exhaust conduit 24. A pair of coaxial shafts 26 and 28 are carried by and extended in opposite directions from the turbine wheel 10 for driving various units of the turbine power plant, and the shaft 26 is journaled within a supporting diaphragm 30. The structure so far described is quite conventional and is described in more detail in applicant's co-pending application Serial No. 565,019 filed November 24, 1944.

In such conventional construction, there is a differential gas pressure across the turbine wheel urging the wheel axially to the left as viewed in the drawing. This axial thrust is carried by a thrust bearing which may be quite complicated because of the magnitude of the thrust and large rotative speeds of the turbine. With the present invention, this axial thrust is balanced by a hydraulic loading piston 32 carried by the turbine shaft 26. This piston is disposed between a nut 34 and a sleeve 36, the nut serving to clamp the piston and sleeve against a shoulder 38 on the shaft 26. With this construction, the nut 34, piston 32 and sleeve 36 are all rigid with the turbine shaft 26.

The annular piston 32 is received within an annular cylindrical space 40 formed by a drum 42 carried by the supporting diaphragm 30 and by an end plate 44 secured to said drum 42. A suitable fluid, preferably lubricating oil for the turbine, is supplied through a conduit 46 to a pump 48 driven by the turbine through suitable gearing (not shown). The pump 48 is provided with a discharge conduit 50 which supplies hydraulic pressure to the cylindrical space 40 behind the piston 32 to oppose the axial thrust on the turbine rotor 10 imposed by the differential pressure of the combustion gas thereacross. The drum 42 is also provided with an inwardly directed flange 52 spaced from the supporting diaphragm 30 and between which an outwardly extending radial flange 54 on the sleeve 36 is disposed. Suitable bearing bushings are disposed between the flanges 52 and 54 and between the flange 54, sleeve 36 and the supporting diaphragm 30. With this construction, if the axial hydraulic thrust imposed by the piston 32 does not exactly counterbalance the thrust imposed upon the turbine wheel 10 by the combustion gas pressure differential thereacross, the resultant thrust is carried by the flange 54.

The thrust carried by the flange 54 is kept at a minimum by controlling the output pressure on the pump 48 in accordance with the combustion gas pressure differential across the turbine wheel. To this end, the pump 48 is provided with a by-pass relief valve 56 cooperating with conduits 58 and 60 to provide a by-pass pressure relief passage around the pump, thereby controlling the pump outward pressure. The relief valve 56 is carried by a diaphragm 62 which divides a housing 64 into a pair of chambers 66 and 68. The chamber 66 is in communication with the upstream side of the turbine wheel 10 through suitable passage means 70, while the chamber 68 is in communication with the downstream side of the turbine wheel through suitable passage means 72. Thus, the diaphragm 62 is subjected to the combustion gas pressure differential across the turbine wheel and this pressure differential urges the relief valve 56 toward its closed position. In this way, the output pressure of the pump 48 is controlled by the relief valve 56 and the larger the combustion gas pressure differential across the turbine wheel 10, the larger is the pump output pressure. Accordingly, by proper selection of the effective relative sizes of the diaphragm 62 and valve 56, the hydraulic pressure supplied to the piston 32 can be made to approximately balance the axial thrust on the turbine rotor produced by the combustion gases.

With this construction, the combustion gas pressure thrust on the turbine rotor is substantially balanced by the hydraulic pressure imposed on the piston 32 and the position of the turbine rotor 10 is accurately determined by the flange 54, which flange also absorbs any resultant thrust on the turbine rotor. This accurate location of the turbine rotor is particularly important in turbines because of the small clearance between the turbine blading.

I claim as my invention:

1. In a turbine power plant a turbine rotor adapted during operation to be subjected to an axial thrust by a pressure differential across said rotor, a pump operative during turbine operation to apply a fluid pressure against a surface on said rotor for opposing said pressure differential, a relief valve for the pump output pressure, and means operable to urge said relief valve in a closing direction with a force variable with changes in said pressure differential.

2. In combination, a turbine rotor subjected to an axial thrust by a pressure differential across said rotor, a hydraulic cell, said rotor closing one end of said cell, pump means operable to supply hydraulic pressure to said cell to subject said rotor to a force opposing said pressure differential, a relief valve for the pump output pressure, and means operable to urge said relief valve in a closing direction with a force variable with changes in said pressure differential.

3. In combination, a turbine rotor adapted during operation to be subjected to an axial thrust by a pressure differential across said rotor, a pump operable to apply a fluid pressure against a surface on said rotor for opposing said pressure differential, a pump by-pass passage providing a fluid path around said pump between the pump inlet and outlet, a valve in said passage urged in an opening direction by the pump output pressure and adapted to open to relieve said pressure, and means operable to urge said relief valve in a closing direction with a force variable with changes in said pressure differential.

4. In combination, a rotatable member subjected to a first axial force during rotation of said member, a support for said rotatable member, means for accurately locating said rotatable member axially relative to said support, said means and rotatable member having radially overlapping and axially rigid cooperating formations preventing axial movement of said rotatable member in both directions relative to said support thereby providing said accurate rotatable member location, a pump operable to provide a fluid pressure, means to apply said fluid pressure to said rotatable member to exert thereon an axial force in opposition to said first axial force, a relief valve controlling said fluid pressure, and means operable to urge said relief valve in a closing direction with a force variable with changes in said first force.

5. In combination, a rotatable member subjected to a first axial force during rotation of said member, a pump operable to provide a fluid pressure, means to apply said fluid pressure to said rotatable member to exert thereon an axial force in opposition to said first axial force, a relief valve controlling said fluid pressure, and means operable to urge said relief valve in a closing direction against said fluid pressure with a force variable with changes in said first force.

WILTON G. LUNDQUIST.

REFERENCES CITED

The following references are of record in the file of this patent:

UNITED STATES PATENTS

| Number | Name | Date |
| --- | --- | --- |
| 545,238 | Le Sueur | Aug. 27, 1895 |
| 553,932 | Parsons | Feb. 4, 1896 |
| 783,153 | Stumpf | Feb 21, 1905 |
| 1,910,811 | Peterson | May 23, 1933 |
| 2,309,296 | Bentley | Jan. 26, 1943 |